(12) United States Patent
Lin

(10) Patent No.: US 10,327,299 B2
(45) Date of Patent: Jun. 18, 2019

(54) LIGHTING APPARATUS

(71) Applicant: BOE TECHNOLOGY GROUP CO., LTD., Beijing (CN)

(72) Inventor: Jie Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/529,978

(22) PCT Filed: Nov. 9, 2016

(86) PCT No.: PCT/CN2016/105191
§ 371 (c)(1),
(2) Date: May 25, 2017

(87) PCT Pub. No.: WO2017/157032
PCT Pub. Date: Sep. 21, 2017

(65) Prior Publication Data
US 2018/0376559 A1    Dec. 27, 2018

(30) Foreign Application Priority Data
Mar. 16, 2016    (CN) .................... 2016 2 0203596 U (51) Int. Cl.
*H05B 33/08* (2006.01)
*H05B 37/02* (2006.01)
(Continued)

(52) U.S. Cl.
CPC .......... *H05B 33/0854* (2013.01); *F21S 6/005* (2013.01); *F21V 21/15* (2013.01);
(Continued)

(58) Field of Classification Search
CPC .......... F21V 21/00; F21V 21/06; F21V 21/08; F21V 23/003; F21V 23/007;
(Continued)

(56) References Cited

U.S. PATENT DOCUMENTS 7,346,196 B2 * 3/2008 Gin ................ G06K 9/00221
348/151
2011/0116266 A1 * 5/2011 Kim ..................... F21V 19/02
362/249.02
(Continued)

FOREIGN PATENT DOCUMENTS

CN    102413614 A    4/2012
CN    102789312 A    11/2012

OTHER PUBLICATIONS

International Search Report and Written Opinion dated Jan. 25, 2017 in PCT/CN2016/105191.

*Primary Examiner* — Thai Pham
(74) *Attorney, Agent, or Firm* — Syncoda LLC; Feng Ma (57) ABSTRACT

The present disclosure discloses a lighting apparatus, which comprises a motion detector, a controller, a main light source, and a motion display portion. The motion detector, the main light source, and the motion display portion are respectively coupled to the controller. The motion detector is configured to sense a control motion at a preset interval and to send a control motion signal to the controller. The controller is configured to send a first control signal to turn on or off the motion display portion according to a first preset condition; and to send a second control signal to, and control to switch on or off, the main light source according a second preset condition. The motion display portion is configured to display a track of the control motion under control of the first control signal. The main light source is configured to emit light under control of the second control signal.

20 Claims, 7 Drawing Sheets

(51) Int. Cl.
*F21V 21/00* (2006.01)
*F21S 6/00* (2006.01)
*F21V 23/04* (2006.01)
*F21V 21/15* (2006.01)

(52) U.S. Cl.
CPC ..... *F21V 23/0471* (2013.01); *H05B 37/0227* (2013.01); *Y02B 20/44* (2013.01)

(58) Field of Classification Search
CPC ..... F21V 23/0471; H05B 37/02; H05B 33/08; H05B 33/0842; H05B 33/0854; H05B 37/0227
See application file for complete search history.

(56) References Cited

U.S. PATENT DOCUMENTS

| | | | |
|---|---|---|---|
| 2013/0021795 A1* | 1/2013 | Chien | H04N 5/2354 362/235 |
| 2017/0059132 A1* | 3/2017 | Chien | F21V 29/20 |
| 2017/0175996 A1* | 6/2017 | Chien | F21S 8/035 |
| 2017/0189731 A1* | 7/2017 | Duncan | A63B 71/0669 |
| 2017/0321850 A1* | 11/2017 | Chien | F21V 29/20 |
| 2017/0363262 A1* | 12/2017 | Chien | F21V 33/0052 |

\* cited by examiner

LIGHTING APPARATUS

CROSS-REFERENCE TO RELATED APPLICATION

The present application claims priority to Chinese Patent Application No. 201620203596.X filed on Mar. 16, 2016, the disclosure of which is hereby incorporated by reference in its entirety.

TECHNICAL FIELD

The present disclosure relates generally to the field of lighting technologies, and more specifically to a lighting apparatus.

BACKGROUND

With the improvement of living standards, lighting apparatuses have become essential in people's work, life and study. At present time, there are many types of lighting apparatuses, including general lighting lamps and specialized lighting devices for specific purposes.

General lighting lamps include incandescent lamps, tungsten halogen lamps, fluorescent lamp, and LED lamps, etc. Specialized lighting devices include supplement lamps, decoration lamps, air heating lamps (for example, bath master), and air sterilization lamps (for example, an ultraviolet lamp), etc.

Regardless of the type each of the current lighting apparatuses belong to, at present time these lighting apparatuses interact with human beings mainly through simple interactions such as switch control, brightness adjustment, and mode switch, etc. These above functionalities are primarily realized through pressing buttons, rotating knobs, touching operations, and non-touch operations (for example, through infrared sensing, gesture detection, or human body motion detection, etc.).

With an increasing demand for higher living standards, the aforementioned simple human-machine interactions have become less and less able to meet people's demands for better lighting apparatuses.

As such, a lighting apparatus that can enrich human-machine interaction to thereby further enhance user experience is needed.

SUMMARY

The present disclosure provides a lighting apparatus, which can display a track of a control motion of a user who turns on the main light source in the lighting apparatus, which can enrich human-machine interactions and enhance the user experience.

A lighting apparatus is disclosed herein, which comprises a motion detector, a controller, a main light source, and a motion display portion. The motion detector, the main light source, and the motion display portion are respectively coupled to the controller.

The motion detector is configured to sense a control motion at a preset interval and to send a control motion signal to the controller. The controller is configured to send a first control signal to turn on or off the motion display portion according to a first preset condition; and to send a second control signal to, and control to switch on or off, the main light source according a second preset condition. The motion display portion is configured to display a track of the control motion under control of the first control signal; and the main light source is configured to emit light under control of the second control signal.

The lighting apparatus can further include a housing, and the main light source can be disposed in the housing. The housing can be provided with at least one of an opening or a transparent sidewall, wherein the light emitted from the main light source is configured to emit out to an outside environment through the at least one of the opening or the transparent sidewall.

In the lighting apparatus, the housing can be further provided with a side panel, wherein the track of the control motion is displayed by the motion display portion on the side panel.

In some embodiments of the lighting apparatus, the motion display portion can include a rotatable lamp and a tracking display. The rotatable lamp is configured to emit a second light. The tracking display is disposed on or configured to be part of the side panel, and the tracking display is transparent or translucent. The rotatable lamp is configured to adjust a direction of the second light to thereby display the track of the control motion on the tracking display.

In some of the embodiments of the lighting apparatus as described above, the rotatable lamp can comprise a driver and a tracking lamp. The driver can include a motor and an output shaft. The motor can be connected to, and configured to drive a rotation of, the tracking lamp via the output shaft to thereby allow adjusting the direction of the second light emitted from the rotatable lamp onto the tracking display.

In some of the embodiments of the lighting apparatus as described above, the rotatable lamp can further include a flange and a tracking lamp holder. The flange can be connected to the output shaft of the driver; and the tracking lamp holder can be connected to the flange and configured for mounting the tracking lamp.

In some embodiments of the present disclosure, the lighting apparatus can further include a light blocking plate, which is disposed between the main light source and the motion display portion, and is configured to prevent the light emitted from the main light source from affecting the motion display portion.

In some embodiments of the lighting apparatus, the motion display portion can include a display, which is disposed on the side panel and is configured to display the track of the control motion thereon.

The display can be an LCD display or an OLED display, but can be other types of display as well.

In the present disclosure, according to some embodiments of the lighting apparatus, the first preset condition can comprise a preset tracking-on condition, and the first control signal can comprise a tracking-on control signal, wherein: the controller is configured to send the tracking-on control signal to, and control to turn on, the motion display portion if the preset tracking-on condition is satisfied.

In some embodiments of the lighting apparatus, the first preset condition can further comprise a preset tracking-off condition, and the first control signal can further comprise a tracking-off control signal, wherein the controller is configured to send the tracking-off control signal to, and control to turn off, the motion display portion if the preset tracking-off condition is satisfied.

In some embodiments of the lighting apparatus, the preset tracking-on condition can comprise at least one of whether a distance between an instant position of the control motion and an initial position of the control motion is larger than, or substantially equal to, a first preset value or whether a shape of track of the control motion is substantially a first preset shape.

In some embodiments of the lighting apparatus, the second preset condition can comprise a preset lighting-on condition, and the second control signal can comprise a lighting-on control signal, wherein the controller is configured to send the lighting-on control signal to, and control to switch on, the main light source if the preset lighting-on condition is satisfied.

In some embodiments of the lighting apparatus, the preset lighting-on condition comprises at least one of whether a distance between a position of the control motion and an initial position of the control motion is larger than, or substantially equal to, a second preset value, or whether a shape of track of the control motion is substantially a second preset shape.

In some embodiments of the lighting apparatus, the second preset condition can further comprise a preset lighting-off condition, and the second control signal further comprises a lighting-off control signal, wherein the controller is configured to send the lighting-off control signal to, and control to switch off, the main light source if the preset lighting-off condition is satisfied.

In some embodiments of the lighting apparatus, the preset lighting-off condition can comprise at least one of whether a distance between a position of the control motion and an initial position of the control motion is larger than, or substantially equal to, a third preset value and whether a shape of track of the control motion is substantially a third preset shape.

According to some embodiments of the present disclosure, the lighting apparatus can further include a second motion detector. The second motion detector can be coupled to the controller, and can be configured to sense a second control motion and to send a second control motion signal to the controller. The second preset condition can further comprise a second preset lighting-off condition; and the controller is configured to send the lighting-off control signal to, and control to switch off, the main light source if the second preset lighting-off condition is satisfied.

In some embodiments of the lighting apparatus as described above, the second motion detector can be an air pressure detector. The air pressure detector is configured to sense an instant change of an air pressure in a proximity thereof. The second preset lighting-off condition can thus comprise whether the instant change of the air pressure is larger than, or substantially equal to, a fourth preset value.

In some embodiments of the lighting apparatus, the motion detector can comprise a touch-control panel, and accordingly the control motion can comprise a touch control motion.

In some embodiments of the lighting apparatus, the motion detector can comprise a pressure motion sensing device, an infrared sensing device, or an image capturing device, but can be of other types.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent according to these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. According to the described embodiments of the disclosure, those ordinarily skilled in the art can obtain other embodiment(s), which come(s) within the scope sought for protection by the disclosure.

The present disclosure provides a lighting apparatus, which comprises a motion detector, a controller, a main light source, and a motion display portion. The motion detector, the main light source, and the motion display portion are respectively coupled to the controller.

The motion detector is configured to sense a control motion at a preset interval and to send a control motion signal to the controller. The controller is configured to send a first control signal to, and control to turn on or off, the motion display portion according to a first preset condition, and to send a second control signal to, and control to switch on or off, the main light source according a second preset condition. The motion display portion is configured to display a track of the control motion under control of the first control signal; and the main light source is configured to emit light under control of the second control signal.

Figure 1A:
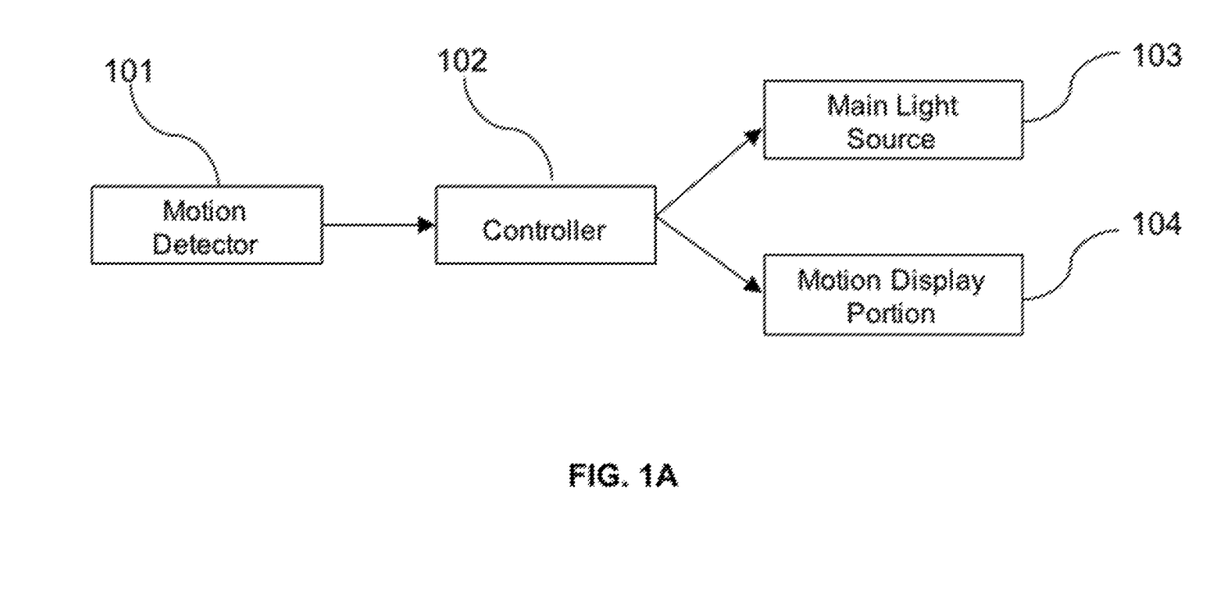
FIG. 1A is a schematic diagram illustrating the working principle of a lighting apparatus according to some embodiments of the present disclosure.

FIG. 1A is a schematic diagram illustrating the working principle of a lighting apparatus according to some embodiments of the lighting apparatus.

As shown in FIG. 1A, the lighting apparatus comprises a motion detector 101, a controller 102, a main light source 103, and a motion display portion 104. These functional modules or functional portions can be disposed in a housing. Each of the main light source 103, the motion detector 101 and the motion display portion 104 is coupled to the controller 102 respectively.

The motion detector 101 is configured to sense or detect a control motion of a user and to send a first control motion signal to the controller 102. Upon receiving the first control motion signal from the motion detector 101, the controller 102 is configured to send a first control signal to the motion display portion 104 according to a first preset condition, and to send a second control signal to the main light source 103 according to a first preset condition.

The motion display portion 104 is configured to display, or to stop displaying, a track of the control motion upon receiving the first control signal from the controller 102. The main light source 103 is configured to be switched on or off upon receiving the second control signal from the controller 102.

The first control signal can comprise a tracking-on control signal and a tracking-off control signal, to respectively control the turning-on and turning-off of the motion display portion 104. The controller 102 is configured to send the tracking-on control signal and the tracking-off control signal according to a preset tracking-on condition and a preset tracking-off condition respectively, which can together constitute the first preset condition.

The second control signal can comprise a lighting-on control signal and a lighting-off control signal, to respectively control the switching-on and switching-off of the main light source 103. The controller 102 is configured to send the lighting-on control signal and the lighting-off control signal according to a preset lighting-on condition and a preset lighting-off condition respectively, which can together constitute the second preset condition.

In the following, detailed description of the lighting apparatus is provided through some embodiments of the present disclosure.

In the lighting apparatus as shown in FIG. 1A, which also represents a first embodiment of the lighting apparatus in the present disclosure, a motion detector 101 detects a control motion of a user and then sends a first control motion signal to a controller 102. Next the controller 102 generates a tracking-on control signal based on the first control motion signal and then sends the tracking-on control signal to a motion display portion 104. The motion display portion 104 then displays a track of the control motion upon receiving the tracking-on control signal from the controller 102.

At the same time when the controller 102 generates the tracking-on control signal, the controller 102 also generates a lighting-on control signal, and then sends the lighting-on control signal to a main light source 103. The main light source 103 is switched on upon receiving the lighting-on control signal from the controller 102.

In the embodiment as described herein, in order to avoid the operational mistakes of users that can accidently switch on the main light source, the condition for turning on the main light source 103 needs to be preset (i.e. the preset lighting-on condition). In one example, the controller 102 can be configured to send the lighting-on control signal to, and subsequently to switch on, the main light source 103 only when a preset lighting-on condition is satisfied. A configuration as such can thus enhance the user experience.

It can be appreciated that the aforementioned preset lighting-on condition can be set based on various different conditions. For example, the preset lighting-on condition can be based on a distance between the initial position and the instant position of the control motion detected by the motion detector 101. This shall not serve as a limitation to the present disclosure however, and the preset lighting-on condition can be set based on practical needs. For example, the preset lighting-on condition can also be other conditions such as that based on a preset specific shape of the track of the control motion.

Figure 1B:
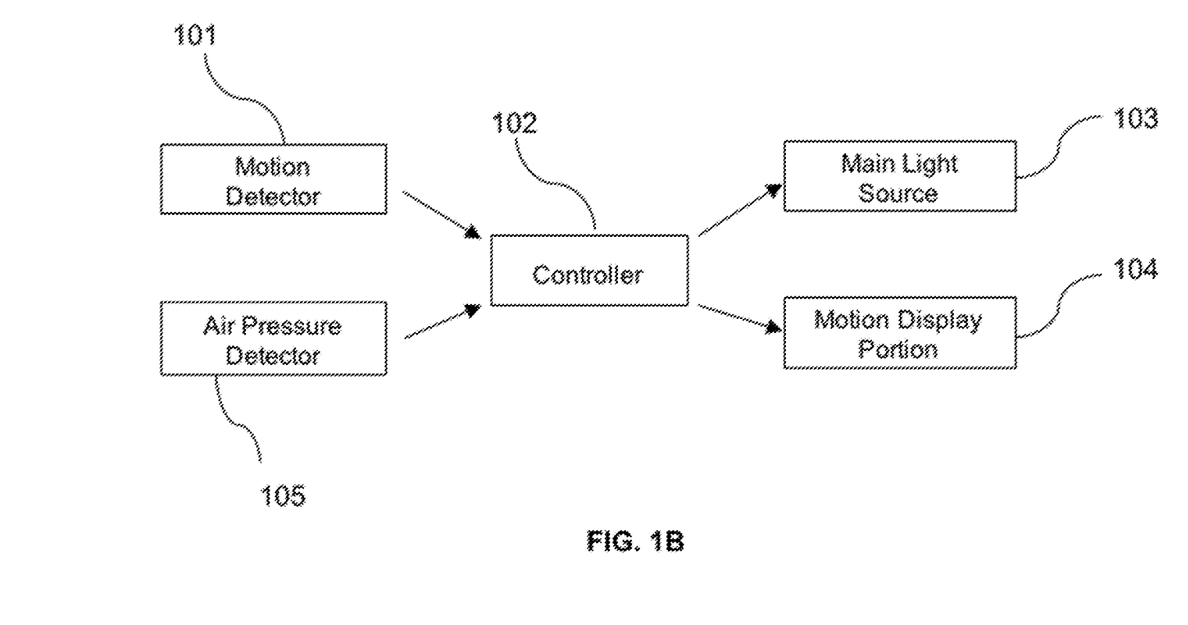
FIG. 1B is a schematic diagram illustrating the working principle of a lighting apparatus according to some other embodiments of the present disclosure.

In order to further enhance the user experience, the lighting apparatus can optionally further comprise an air pressure detector 105 that is disposed in the housing and is also coupled to the controller 102, which is illustrated in FIG. 1B and represents a second embodiment of the present disclosure.

In this second embodiment of the lighting apparatus, the air pressure detector 105 is configured to sense or detect an instant change of an air pressure in the proximity of the air pressure detector 105, and then to send a second control motion signal to the controller 102. The controller 102 is configured to further send a lighting-off control signal to the main light source 103 based on the second control motion signal. The main light source 103 is configured to be switched off upon receiving the lighting-off control signal from the controller 102.

Through this configuration, the main light source 103 can be switched off, for example, when a user blows air towards the air pressure detector 105 of the lighting apparatus.

In both the first embodiment and the second embodiment of the lighting apparatus, the preset lighting-off condition can also be preset. For example, the preset lighting-off condition can be set based on a distance between a first preset position and an instant position of the control motion that is detected, or can be a preset specific shape formed by the track of the control motion that is detected. Herein the first preset position can be, for example, a position of one end point for the motion display portion 104.

Similarly, in order to avoid display mistakes of the motion display portion 104, a tracking-on condition and a tracking-off condition to control the motion display portion 104 to display, or to stop displaying, the track of the control motion can also be preset i.e., the preset tracking-on condition and the preset tracking-off condition. Herein the preset tracking-on condition and the preset tracking-off condition can be set with reference to the preset lighting-on condition and the preset lighting-off condition. The description of these conditions is skipped herein.

Figure 2:
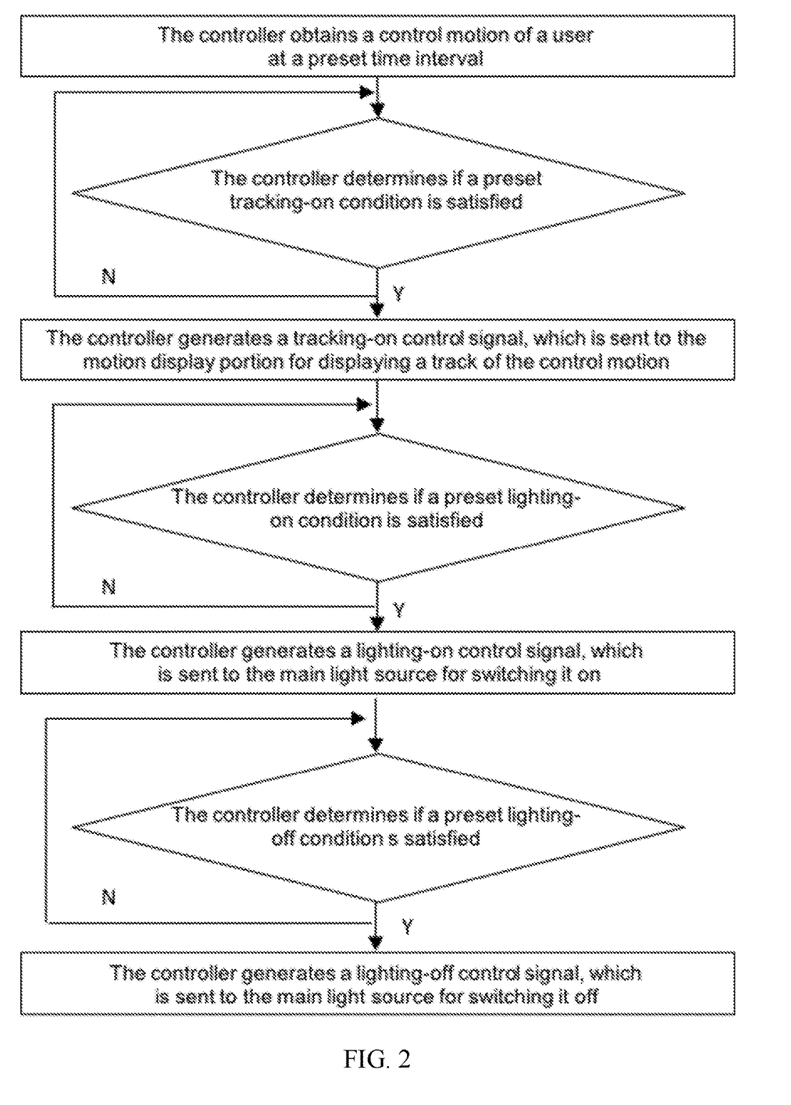
FIG. 2 is a flow chart illustrating the process for controlling a lighting apparatus according to some embodiments of the present disclosure.

FIG. 2 is a flow chart illustrating a process for controlling the lighting apparatus as described above according to some embodiments of the present disclosure. As shown in FIG. 2, the process for controlling the main light source 103, the motion display portion 104, the motion detector 101, and the controller 102 of the lighting apparatus is as follows.

The controller 102 obtains a control motion of a user at a preset time interval, and the controller 102 determines whether a preset tracking-on condition is satisfied.

If the preset tracking-on condition is not satisfied, the controller 102 continues to obtain the control motion of the user and determine whether the preset tracking-on condition is satisfied repeatedly.

If the preset tracking-on condition is satisfied, the controller 102 generates a tracking-on control signal and then sends the tracking-on control signal to the motion display portion 104 for displaying a track of the control motion.

Once the preset tracking-on condition is satisfied, the control motion detector 101 continuously detects the control motion and sends the tracking-on control signal of the control motion to the controller 102. The controller 102 in turn sends the tracking-on control signal to the motion display portion 104 for tracking the control motion, until the control motion completes. The tracking-on control signal can comprises information of positions of the control motion.

At the same time, the controller 102 also determines whether a preset lighting-on condition is satisfied: if the preset lighting-on condition is satisfied, the controller 102 generates a lighting-on control signal to the main light source 103 for switching on the main light source 103; otherwise, the controller 102 does not generate the lighting-on control signal, and the main light source 103 remains off.

After the main light source 103 is switched on, the controller 102 determines whether a preset lighting-off condition is satisfied: if the preset lighting-off condition is satisfied, the controller 102 generates a lighting-off control signal to control the switch-off of the main light source 103;

otherwise, the main light source 103 remains on, and the controller 102 continues to obtain the control motion and to determine whether the preset lighting-off condition is satisfied repeatedly, until the preset lighting-off condition is satisfied, when the main light source 103 is switched off.

As such, the controller 102 can determine, based on a control motion of a user detected by the motion detector 101, whether the preset tracking-on condition is satisfied, and then it can determine whether the preset lighting-on condition is satisfied. It can also determine whether the preset tracking-off condition is satisfied, and at last it determines whether the preset lighting-off condition is satisfied. The order for the determination processes of the controller 102 as described above can be arranged depending on practical needs, and there are no limitations herein.

In the following, the process for controlling the main light source 103, the motion display portion 104, the motion detector 101 and the controller 102 is described in detail through one embodiment of the present disclosure.

In this embodiment of the present disclosure, under control of the controller 102, a user can control to switch on the main light source 103 by touching detected by the motion detector 101, and a track of the user's touch motion can be displayed via the motion display portion 104.

As such, the controlling process of the main light source 103, the motion display portion 104, the motion detector 101 and the controller 102 can be as follows.

The motion detector 101 detects a control motion (i.e. touch control motion) of a user at a preset time interval (for example, 5 milliseconds) and then sends a first control motion signal (i.e. positions of the control motion) to the controller 102. While obtaining the positions of the control motion of the user, the controller 102 stores an initial position of the control motion.

The controller 102 then determines whether the preset tracking-on condition is satisfied, which can be, for example, whether the distance between an instant position of the control motion and the initial position of the control motion is larger than, or equal to, a first preset value (for example, 50 mm), but can be other conditions as well, such as, whether the track of the control motion is substantially identical to a preset shape (e.g. a line).

If yes, the controller 102 generates a tracking-on control signal, which is sent to the motion display portion 104 for displaying the track of the control motion based on the positions of the control motion received from the motion detector 101.

At the same time, the controller 102 determines whether a preset lighting-on condition is satisfied. Such preset lighting-on condition can be, for example, whether the distance between the instant position and the initial position of the control motion is larger or equal to a second preset value (e.g. 75 mm), and can also be other conditions such as whether the track of the control motion is of a certain shape (e.g. a circle).

If yes, the controller 102 generates a lighting-on control signal, which is sent to, and thereby controls to switch on, the main light source 103; otherwise, the main light source 103 remains off.

The controller 102 can continue to determine whether the preset tracking-off condition is satisfied, which can be, for example, whether the control motion completes (i.e. touch control finishes), but can be other conditions as well, such as whether the main light source 103 is switched on. If yes, the motion display portion stops displaying the track of the control motion.

After the main light source 103 is switched on, the controller 102 determines whether the preset lighting-off condition is satisfied, which can be, for example, whether the distance between the instant position of a second control motion and one end point of the motion display portion is smaller or equal to certain preset value (for example, 25 mm), or can be whether the distance between an instant position and an initial position of a second control motion is larger than, or substantially equal to, a certain preset value, or can be whether the track of the control motion takes a certain shape (e.g. a straight line), but can be other conditions as well.

If yes, the controller 102 controls the main light source 103 to be turned off; otherwise, the main light source 103 remains on, and the controller 102 continues to receive control motions and to repeatedly determine whether the aforementioned preset lighting-off condition is satisfied, until it is satisfied, then it controls the main light source 103 to be turned off.

In some other embodiments of the present disclosure, it can also be implemented as follows: after the main light source 103 is switched on, the controller 102 obtains an instant changes in air pressure (for example, air pressure change within 5 s) in the proximity of the air pressure detector 105 at a preset time interval (for example, 6 milliseconds), and determines whether the instant change in air pressure is larger or equal to a preset value (for example, 150 Pa): if yes, it controls the main light source 103 to be turned off otherwise, the main light source 103 remains on.

In such manner, the lighting apparatus in the embodiment as described above can actually achieve an effect that the main light source 103 can be blown off by a user blowing air to the housing of the light apparatus through detecting the instant change of air pressure in the proximity of the air pressure detector 105 in the housing. The user experience can thereby be further enhanced.

Figure 3A:
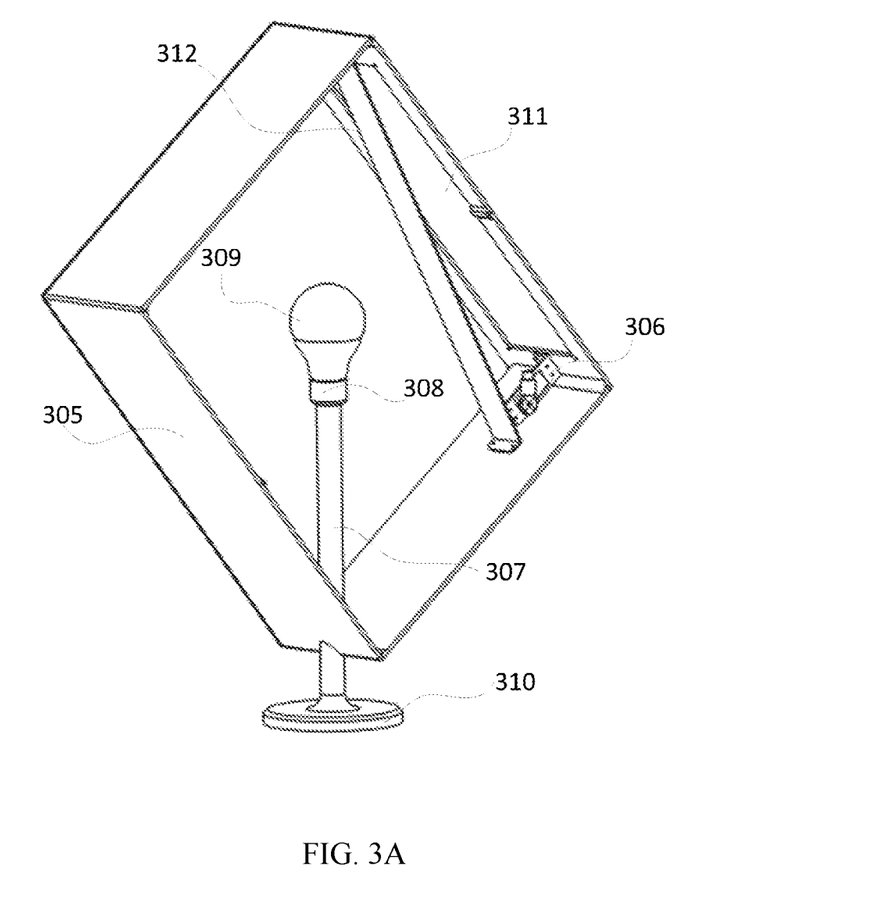
FIG. 3A is a structural diagram of a lighting apparatus according to some embodiments of the present disclosure.
Figure 3B:
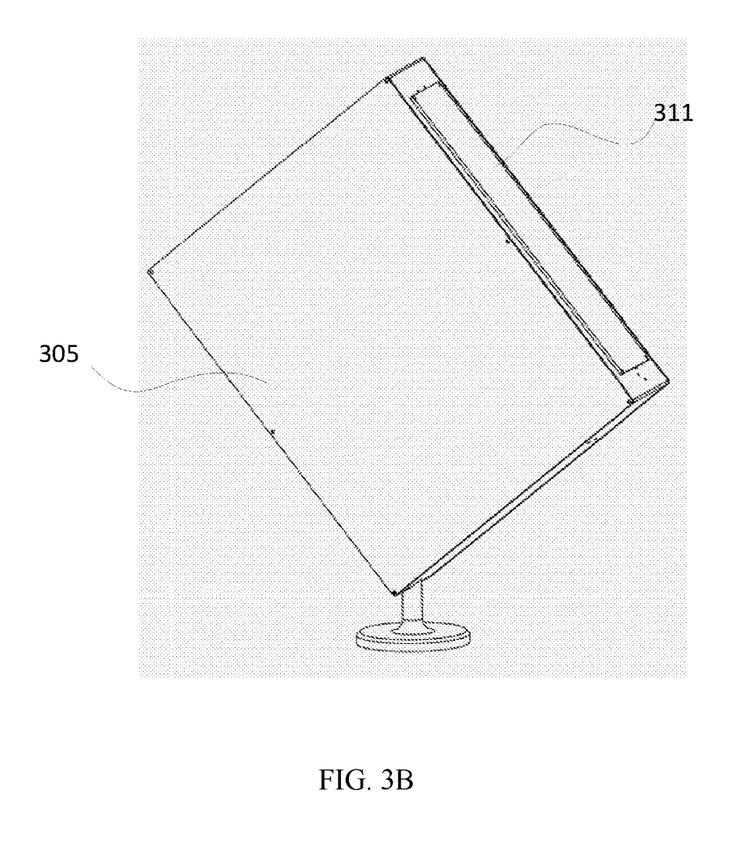
FIG. 3B is a rear view of the lighting apparatus as shown in FIG. 3A.

FIG. 3A and FIG. 3B illustrate a lighting apparatus according to some embodiments of the present disclosure. As shown in FIG. 3A and FIG. 3B, the motion display portion 104 comprises a rotatable lamp 306 and a tracking display 311, both of which can be disposed in or on the housing 305. An output terminal of the controller 102 is coupled to the rotatable lamp 306.

The controller 102 is configured to send a first control signal to the rotatable lamp 306 according to the first control motion signal received from the motion detector 101. The rotatable lamp 306 is configured to then adjust a direction of a light emitted the rotatable lamp 306 according to the first control signal, which allows the emitted light to thereby reflect the track of the control motion onto the tracking display 311.

The tracking display 311 can be a portion of the housing 305 as shown in FIG. 3A and FIG. 3B, and can also be a separate component arranged in the housing 305. If the tracking display 311 is a portion of the housing 305 and the rotatable lamp 306 is disposed inside the housing 305, the portion of the housing corresponding to the tracking display 311 can have a transparent or translucent structure as shown in FIG. 3A and FIG. 3B.

If the tracking display is a separate component arranged inside the housing 305, the side wall of the housing 305 corresponding to the tracking display needs to be of transparent or translucent structure, and the tracking display needs to have a transparent or translucent structure. If the rotatable lamp 306 is disposed outside the housing 305, there are no special requirements for the tracking display and it can be configured and disposed according to practical needs.

Figure 4:
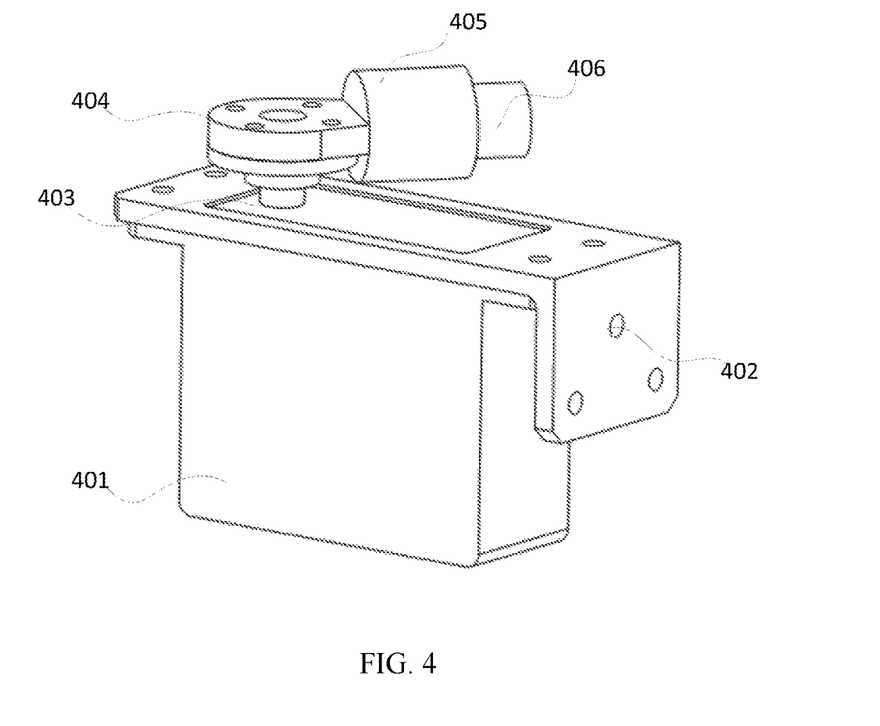
FIG. 4 is a structural diagram of a rotatable lamp in the lighting apparatus as shown in FIG. 3A.

In the lighting apparatus according to some embodiments of the present disclosure as shown in FIG. 3A and FIG. 4, the rotatable lamp 306 comprises: a driver and a tracking lamp 406, and the controller 102 comprises a signal output terminal and a main control sub-portion (or a main control sub-module), wherein the output terminal of the controller 102 is coupled to the driver of the rotatable lamp 306.

The driver comprises a motor and an output shaft, wherein the output shaft is connected to the motor, and the output shaft is also coupled to the tracking lamp 406.

The main control sub-portion (or a main control sub-module) generates the first control signal according to the first control motion signal and further outputs the first control signal from the signal output terminal to the driver. In the driver, the motor controls the motion of the output shaft according to the first control signal to adjust the direction of the emitted light of the tracking lamp 406 to further enable the emitted light to reflect the track of the control motion onto the tracking display.

In the embodiment as described herein, a rotatable lamp that can be rotated at all directions is employed to display the track of the control motion. Under such configuration, only one light source is needed, and no other supplemental lighting devices or components are needed to form the track of the control motion. As such, the cost of the lighting apparatus can be reduced.

In some optional embodiment, as shown in FIG. 4, the driver can be a steering gear 401, which can comprise a motor and an output shaft, wherein the output shaft is connected to the motor.

The lighting apparatus can further comprise a mounting rack 402, a flange 404, and a tracking lamp holder 405. The steering gear 401 can be mounted onto the housing 305 through the mounting rack 402. A plurality of through-holes are arranged on the mounting rack 402, and the output shaft 403 can be connected to the flange 404 through one of the through-holes.

The tracking lamp holder 405 can be mounted onto the flange 404, and the tracking lamp 406 can be mounted onto the tracking lamp holder 405. The mounting rack 402 can comprise a first mounting portion and a second mounting portion, wherein the first mounting portion and the second mounting portion are connected vertically.

The first mounting portion is mounted onto one side wall of the steering gear 401. The aforementioned through-holes are arranged over the first mounting portion, and the output shaft 403 is connected to the flange 404 through the through-holes on the first mounting portion. The second mounting portion is mounted onto the housing 305. The first mounting portion and the second mounting portion of the mounting rack 402 can be connected vertically, and this type of vertical connection is convenient for the steering gear 401 to be mounted on a vertical mounting plane as shown in FIG. 3A.

The employment of a steering gear in the lighting apparatus according to some embodiments of the present disclosure can improve the stability, and simplify the structure, of the lighting apparatus.

As for the embodiment as shown in FIG. 3A, FIG. 3B and FIG. 4, it can be appreciated that displaying of the track of control motion can be realized by controlling the rotation of the tracking lamp 406.

Specifically, a rotating angle of the tracking lamp 406 can be calculated through formula (1), with information about a position of the control motion detected, a position of the projection of the tracking lamp 406 on the tracking display 311, a vertical distance between the tracking lamp 406 and the tracking display 311, and an initial angle of the tracking lamp 406:

$$AZ = a\tan(1/r) - A0 \qquad (1)$$

Herein, AZ is the rotating angle of the tracking lamp 406; AO is the initial angle of the tracking lamp 406; l is the distance between the first position and the second position, wherein the first position is the instant position of the detected control motion of the user, and the second position is the position of the projection of the tracking lamp on the tracking display 311; and r is the vertical distance between the tracking lamp and the tracking display 311.

Figure 5:
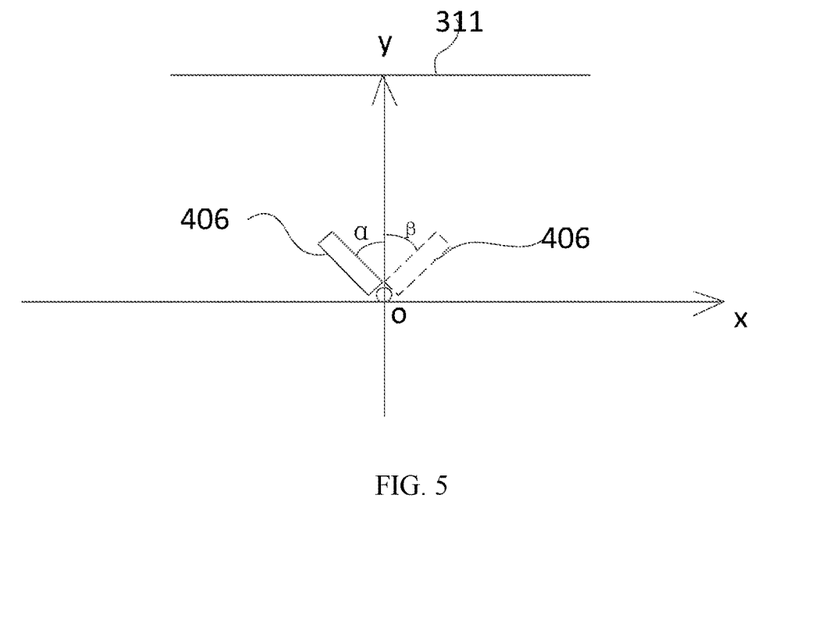
FIG. 5 is a schematic view of an initial angle of a tracking lamp as shown in FIG. 4.

It should be noted that the initial angle of the tracking lamp 406 can be positive or negative. As shown in FIG. 5, the mounting point of the tracking lamp 406 can be regarded as the origin o of a rectangular coordinate system, and the line connecting the mounting point of the tracking lamp 406 and the projection point of the tracking lamp 406 on the tracking display 311 can be a y-axis of the rectangular coordinate system.

When the direction of the origin o towards the projection point of the tracking display 311 is a positive direction of the y-axis, the straight line that goes through the origin o and is perpendicular to the y-axis is an x-axis of the rectangular coordinate system.

When a rotatable end of the tracking lamp 406 is located in the second quadrant or in the third quadrant, the initial angle of the tracking lamp 406 AO is a negative value. For example, if the angle between the rotatable end of the lamp 406 and the y-axis is α, where α=10°, then at this moment, the initial angle of the tracking lamp 406 AO=α=−10°.

When the rotatable end of the tracking lamp 406 is located in the first quadrant or in the fourth quadrant, the initial angle AO of the tracking lamp 406 is a positive value. For example, if the angle between the rotatable end of the tracking lamp 406 and the y-axis is β, where β=10°, then at this moment, the initial angle of the tracking lamp 406 AO=β=10°. The rotatable end of the tracking lamp 406 is the end portion of the tracking lamp 406 that rotates under the control of the driver.

Figure 6:
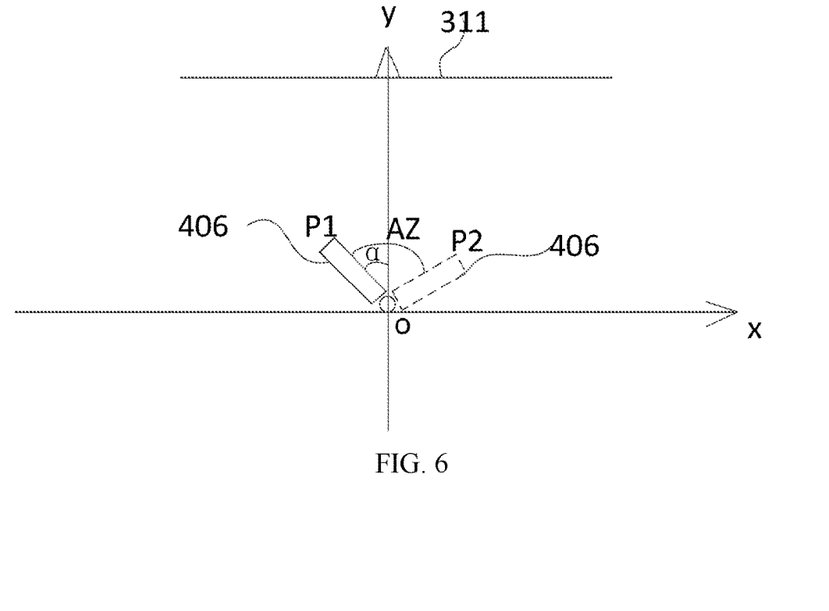
FIG. 6 is a schematic view illustrating the change of the rotating angle of the tracking lamp shown in FIG. 4.

As shown in FIG. 6, if the instant position of one detected control motion of the user is the first position, and the position of the rotatable end of the tracking lamp 406 corresponding to the first position is P1, then the initial angle of the tracking lamp 406 is α. After a time period t, the instant position of the detected control motion of the user becomes the second position, then the rotating angle of the tracking lamp 406 calculated by the controller according to the above formula is AZ. The rotating angle AZ is then sent to the steering gear 401, and the steering gear 401 drives the tracking lamp 406 to rotate an angle of AZ to P2, in turn realizing the display of the track of the control motion.

The motion detector is generally configured to obtain the instant position of a control motion at a preset time interval, then with the progression of the control motion, the controller can calculate out multiple rotating angles corresponding to the control motion. Herein the multiple rotating angles correspond to instant positions of multiple display points. Because positions of multiple display points are to be obtained with the progression of the control motion, the multiple display points together can thus form a track of the control motion.

It can be appreciated that the control motion for the lighting apparatus as described above can be a touch-control motion, and can also be a non-touch-control motion.

As for a touch-control lighting apparatus which responds to a touch control motion, the motion detector 101 can comprise a touch-control panel; and the motion display portion 104 can comprise a display panel. The touch-control panel and the display panel are coupled to the controller 102 respectively. The touch-control panel senses the touch-control motion of a user and sends the first control motion signal to the controller 102; the controller 102 then sends the first control signal to the display panel according to the first control motion signal; and the display panel then displays a track of the touch-control motion according to the first control signal.

The lighting apparatus according to some embodiments of the present disclosure as described above can adopt existing touch-control panels and can thus enjoy a simplified manufacturing process. For example, existing touch-control displays can be adopted for the touch-control panel and the display panel, which can sense the touch-control motion of the user and can display the track of the touch-control motion, thus resulting in a reduced volume of the lighting apparatus.

It can be appreciated that the aforementioned touch-control displays can be adopted in a lighting apparatus where the control motion applied to the lighting apparatus is a touch-control motion. The touch-control motion can be detected by sensing the pressure at a touch-control point, and as such, the motion detector can be a pressure motion detection device.

The motion detector can also be an infrared sensing device or an image capturing device that is employed to sense the gesture or the body motion of the user.

In order to reduce the volume of the lighting device, preferably, the motion detector can be of a planar structure. Because a planar structure can be conveniently disposed over a side wall of the housing 305, the volume of the lighting apparatus can thus be reduced.

As shown in FIG. 3A, in the lighting apparatus according to some embodiments of the present disclosure, the main light source 103 comprises: a supporting rod 307, a lamp holder 308, and a main lamp 309, which can be all disposed in the housing 305. A first end of the supporting rod 307 is disposed on the housing 305; the main lamp 309 is mounted on the lamp holder 308; the lamp holder 308 is disposed at a second end of the supporting rod 307; the controller 102 is coupled to the main lamp 309; the controller 102 sends the second control signal to the main lamp 309 according to the first control motion signal; and the main lamp 309 is switched on upon receiving the second control signal.

The main lamp 309 can be mounted inside the housing 305. The bottom portion of the supporting rod 307 can be configured to extend outside the housing 305, and the bottom portion of the supporting rod 307 that extends outside the housing 305 can be disposed on a base 310. The base 310 can be circular disk-shaped as shown in FIG. 3A, or it can also be of any other shapes.

On the one hand, the base 310 can keep the supporting rod 307 stable, and therefore keep the main lamp 309 stable; and on the other hand, because the supporting rod 307 and the housing 305 are connected to each other, the stability of the supporting rod 307 can ensure the stability of the housing 305, which further ensure the stability of the whole lighting apparatus.

In order to allow the light emitted from the main lamp 309 of the main light source to emit out and shed to an outside environment, the housing 305 can be provided with an opening or a transparent sidewall (not shown in the drawings), allowing the light to emit therethrough.

In practical application, in order to diversify the lighting styles of the housing to satisfy the various needs of users, the main light source can be an LED array (not shown in the figures). The LED array can be disposed over an inner wall of the housing 305; the controller 102 can be connected to the LED array; the controller 102 is configured to send the second control signal to the LED array according to the first control motion signal; and the LED array is configured to be switched on upon receiving the second control signal.

Because the LED array can display multiple colors, it can be employed to emit single-color light or multi-color light, and it can also be controlled to display transitional light. For example, the LED array can appear to be black in the middle and gradually change to yellow and orange at the outer layers, which gives user the warm feeling of a burning flame. As such, the user experience can be further enhanced. The color and style of the light of the LED array can be set according to needs.

In order to prevent a shadow of the main light source from influencing the display effects over the motion display portion, the lighting apparatus can further include a light blocking plate 312 as shown in FIG. 3A. The light blocking plate 312 can be disposed between the main lamp 309 and the rotatable lamp 306. The two ends of the light blocking plate 312 can be respectively disposed onto two side walls of the housing 305. The effects of the main lamp 309 on the tracking lamp 406 over the tracking display 311 can thus be blocked, ensuring the display effects of the motion display portion. It can be appreciated that the light blocking plate 312 can be of any non-transparent materials, and can, for example, be an ordinary wood plate, a light-proof plastic plate, or a light absorbing black cloth.

The housing 305 can be of a regular shape such as the shape of a cube or a sphere, and can also be of an irregular shape; there are no limitations herein. The housing 305 can be configured to be of an enclosed structure, in order to keep the inside of the housing clean and to prevent the components in the housing (especially electronic components) from being damaged by the environmental factors such as dust, etc. As such, the life of the electronic components, and of the whole lighting apparatus as well, can be extended.

To allow for lighting over the outside environmental, the housing can further comprise at least one transparent or translucent side wall. As such, a color film can also be disposed over the side wall. The color film can generally comprise a decorative material, and is often employed for decorating reinforced glass. A color pattern can be arranged on the color film, where corresponding color patterns can be formed under the light emitted from the main light source, thereby the lighting apparatus can display the pattern on the color film.

In summary, the lighting apparatus according to the embodiments of the present disclosure as described above can not only control the main light source to be switched on through sensing the control motion of the user, but also display the track of the control motion that turns on the main light source. As a result, the interaction between users and the lighting apparatus goes beyond simple on-off switching or brightness adjustment, and as such, the human-machine interactions are enriched and the user experience is enhanced.

It should be noted that the above embodiments of the present disclosure are intended to describe rather than limit the disclosure, and that those skilled in the art can design alternative embodiments without departing from the scope of the claim.

In the claims, any reference signs placed between parentheses should not be construed as limitations to the claims. The word "comprise(s)", "include(s)", "comprising" and "including" do not exclude components or steps that are not listed in the claims. The word "a" or "an" does not exclude the existence of a plurality of such components.

The present disclosure may be implemented by a hardware comprising several distinct components or by means of a computer that is suitably programmed. In a single claim that lists several components, these components may be implemented through a single hardware.

The use of the word "first," "second," and "third," etc. does not denote any order. These words can be interpreted as names. It should be noted that orientation or positional relationship indicated by the terms such as "above" or "below" are orientation or positional relationship according to the drawings, the description of the disclosure is only to facilitate and simplify the present description, and does not indicate or imply device or element referred to must have a particular orientation, or it must be constructed or operated with particular orientation, and therefore it cannot be construed as limiting the present disclosure.

Unless otherwise clearly defined and limited, the term "mounted," "connected," "connection," "coupled," and "coupling" should be broadly interpreted. For example, it may be a fixed connection, a removable connection, or an integral connection. It may be a mechanical connection or an electrical connection. It may be a direct connection, or may be a connection through intermediaries, or an internal connection of two components. Those of ordinary skill in the art can understand the meanings of the aforementioned terms in present disclosure according to the specific context.

In the description of the present disclosure, numerous specific details are described. However, it can be understood that the embodiments of the present disclosure may be implemented without these specific details. In some embodiments, well-known methods, structures and techniques are not described in details, so as not to obscure the comprehension to this description.

Similarly, it should be understood, that in order to simplify the present disclosure and help the understanding of one or multiple aspects of the present disclosure, in the description of the embodiments of the present disclosure, various features of the present disclosure can sometimes be grouped together in a single embodiment, figure, or description thereof.

However, it should not be interpreted as the methods of the present disclosure reflecting the following intentions: that is, the present disclosure requires more features than the features expressly described in each of the claims.

More specifically, as reflected in the claims, inventive aspects are less than all features of a single embodiment disclosed above. Thus, the claims following the requirements of specific embodiments are hereby expressly incorporated into these particular embodiments, each claim itself is regarded as a separate embodiment of the present disclosure.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A lighting apparatus, comprising a motion detector, a controller, a main light source, and a motion display portion, wherein:
   the motion detector, the main light source, and the motion display portion are respectively coupled to the controller;
   the motion detector is configured to sense a control motion at a preset interval and to send a control motion signal to the controller;
   the controller is configured to:
      send a first control signal to turn on or off the motion display portion according to a first preset condition; wherein the first preset condition comprises a preset tracking-on condition or a preset tracking-off condition, and the first control signal comprises a tracking-on control signal or a tracking-off control signal; and
      send a second control signal to, and control to switch on or off, the main light source according a second preset condition; wherein the second preset condition comprises a preset lighting-on condition or a preset lighting-off condition, and the second control signal comprises a lighting-on control signal or a lighting-off control signal;
   the motion display portion is configured to display a track of the control motion under control of the first control signal; and
   the main light source is configured to emit light under control of the second control signal.

2. The lighting apparatus of claim 1, further comprising a housing, provided with at least one of an opening or a transparent sidewall, wherein:
   the main light source is disposed in the housing; and
   the light emitted from the main light source is configured to emit out to an outside environment through the at least one of the opening or the transparent sidewall.

3. The lighting apparatus of claim 2, wherein the housing is further provided with a side panel, wherein the track of the control motion is displayed by the motion display portion on the side panel.

4. The lighting apparatus of claim 3, wherein the motion display portion comprises:
   a rotatable lamp, configured to emit a second light; and
   a tracking display, disposed on or configured to be part of the side panel;
   wherein:
      the tracking display is transparent or translucent; and
      the rotatable lamp is configured to adjust a direction of the second light to thereby display the track of the control motion on the tracking display.

5. The lighting apparatus of claim 4, wherein the rotatable lamp comprises:
   a tracking lamp;
   wherein:
      the controller is configured to control adjusting the direction of the second light emitted from the rotatable lamp onto the tracking display.

6. The lighting apparatus of claim 5, wherein the rotatable lamp further comprises:
   a flange; and a tracking lamp holder, connected to the flange and configured for mounting the tracking lamp.

7. The lighting apparatus of claim 4, further comprising a light blocking plate, disposed between the main light source and the motion display portion, and configured to prevent the light emitted from the main light source from affecting the motion display portion.

8. The lighting apparatus of claim 3, wherein the motion display portion comprises a display, disposed on the side panel and configured to display the track of the control motion thereon.

9. The lighting apparatus of claim 1, wherein:
the controller is configured to send the tracking-on control signal to, and control to turn on, the motion display portion if the preset tracking-on condition is satisfied.

10. The lighting apparatus of claim 9, wherein the display is selected from a liquid-crystal display (LCD) or an organic light-emitting diode (OLED) display.

11. The lighting apparatus of claim 9, wherein:
the controller is configured to send the tracking-off control signal to, and control to turn off, the motion display portion if the preset tracking-off condition is satisfied.

12. The lighting apparatus of claim 9, wherein the preset tracking-on condition comprises at least one of:
whether a distance between an instant position of the control motion and an initial position of the control motion is larger than, or substantially equal to, a first preset value; or
whether a shape of track of the control motion is substantially a first preset shape.

13. The lighting apparatus of claim 1, wherein:
the controller is configured to send the lighting-on control signal to, and control to switch on, the main light source if the preset lighting-on condition is satisfied.

14. The lighting apparatus of claim 13, wherein the preset lighting-on condition comprises at least one of:
whether a distance between a position of the control motion and an initial position of the control motion is larger than, or substantially equal to, a second preset value; or
whether a shape of track of the control motion is substantially a second preset shape.

15. The lighting apparatus of claim 13, wherein:
the controller is configured to send the lighting-off control signal to, and control to switch off, the main light source if the preset lighting-off condition is satisfied.

16. The lighting apparatus of claim 15, wherein the preset lighting-off condition comprises at least one of whether a distance between a position of the control motion and an initial position of the control motion is larger than, or substantially equal to, a third preset value and whether a shape of track of the control motion is substantially a third preset shape.

17. The lighting apparatus of claim 15, further comprising a second motion detector, wherein:
the second motion detector is coupled to the controller, and is configured to sense a second control motion and to send a second control motion signal to the controller;
the second preset condition further comprises a second preset lighting-off condition; and
the controller is configured to send the lighting-off control signal to, and control to switch off, the main light source if the second preset lighting-off condition is satisfied.

18. The lighting apparatus of claim 17, wherein the second motion detector is an air pressure detector, wherein:
the air pressure detector is configured to sense an instant change of an air pressure in a proximity thereof; and
the second preset lighting-off condition comprises whether the instant change of the air pressure is larger than, or substantially equal to, a fourth preset value.

19. The lighting apparatus of claim 1, wherein the motion detector comprises a touch-control panel, and the control motion comprises a touch control motion.

20. The lighting apparatus of claim 1, wherein the motion detector comprises a pressure motion sensing device, an infrared sensing device, or an image capturing device.

* * * * *